United States Patent [19]

Roth et al.

[11] 4,015,518
[45] Apr. 5, 1977

[54] APPARATUS FOR FORMING A VARIETY OF SHAPED BODIES WITH AN INTERNAL FILLING

[75] Inventors: Howard Roth, Yonkers, N.Y.; Peter R. Baldry, Greenwich, Conn.; Harold B. Kaufman, Jr., New York, N.Y.; John P. McCarthy, College Point, N.Y.; Kurt Wallenfels, Jackson Heights, N.Y.

[73] Assignee: DCA Food Industries Inc., New York, N.Y.

[22] Filed: Mar. 16, 1976

[21] Appl. No.: 667,379

[52] U.S. Cl. .............................. 99/450.6; 222/482; 222/565
[51] Int. Cl.² ......................................... A21C 9/06
[58] Field of Search ........... 99/450.6, 450.7, 450.8, 99/345; 222/482, 484–485, 565; 425/133, 363, 461

[56] References Cited

UNITED STATES PATENTS

| 798,251 | 8/1905 | Averay-Jones | 99/450.6 |
| 1,310,062 | 7/1919 | Costello, Jr. | 425/462 |
| 2,272,260 | 2/1942 | Ballentine et al. | 222/482 |
| 3,615,147 | 10/1971 | Hayashi | 99/450.7 X |
| 3,679,338 | 7/1972 | Lutz | 99/450.7 X |
| 3,806,290 | 4/1974 | Graff et al. | 99/450.6 X |

FOREIGN PATENTS OR APPLICATIONS 763,214 | 7/1967 | Canada ............................. 99/450.7

Primary Examiner—Harvey C. Hornsby
Assistant Examiner—Arthur O. Henderson
Attorney, Agent, or Firm—Amster & Rothstein

[57] ABSTRACT

An apparatus for repeatably forming shaped dough bodies having a filling. A generally cylindrical filling forming mechanism, in communication with a pressurized source of filling material, is contained within and is surrounded by a generally cylindrical dough forming mechanism in communication with a pressurized source of dough. The filling forming mechanism includes an inner chamber which receives the filling material, means defining a filling material transporting channel extending around the circumference of the filling forming mechanism which channel can be selectively opened to permit the filling material to flow out of it, and a generally cylindrical shell member which is mounted to obstruct the filling material transporting channel and which includes a plurality of shaped filling forming orifices in its periphery. The dough forming mechanism has dough forming orifices in its periphery which are aligned with corresponding filling forming orifices in the shell member of the filling forming mechanism. Means are provided for opening and closing the filling material transporting channel and dough forming orifices in timed relationship to produce the shaped, filled bodies.

25 Claims, 11 Drawing Figures

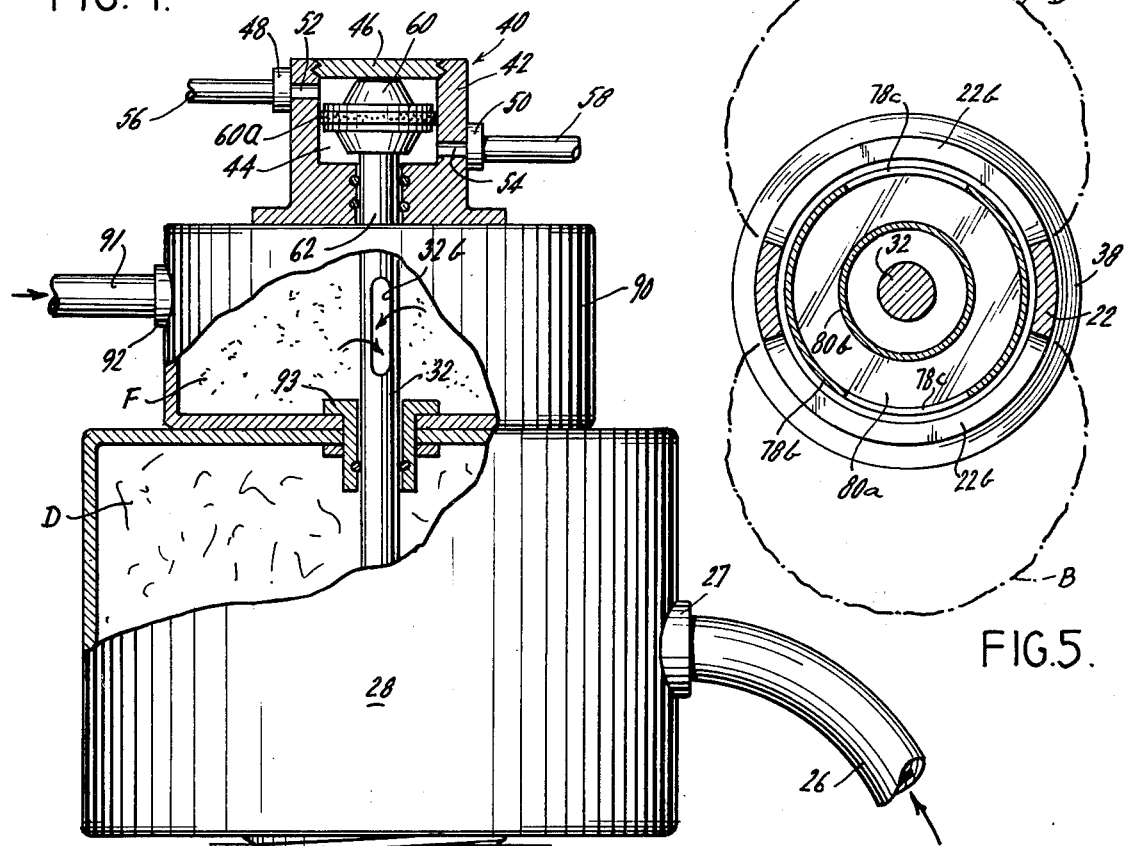
FIG. 1.
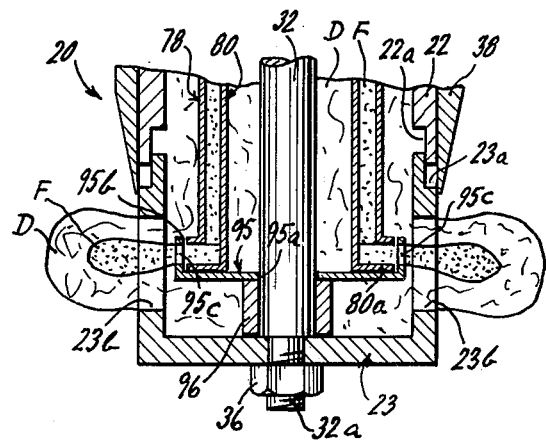
FIG. 5.
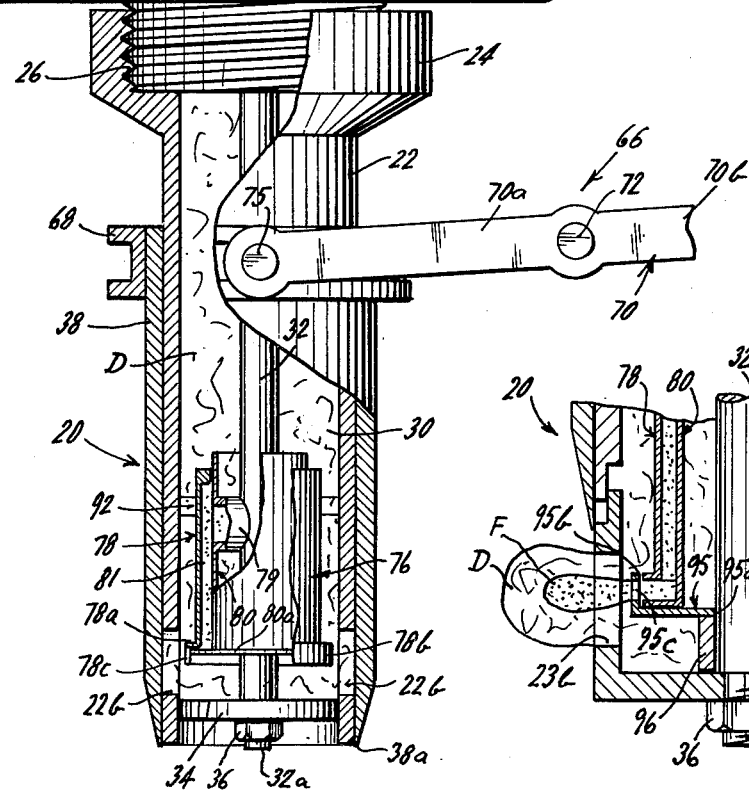
FIG. II.

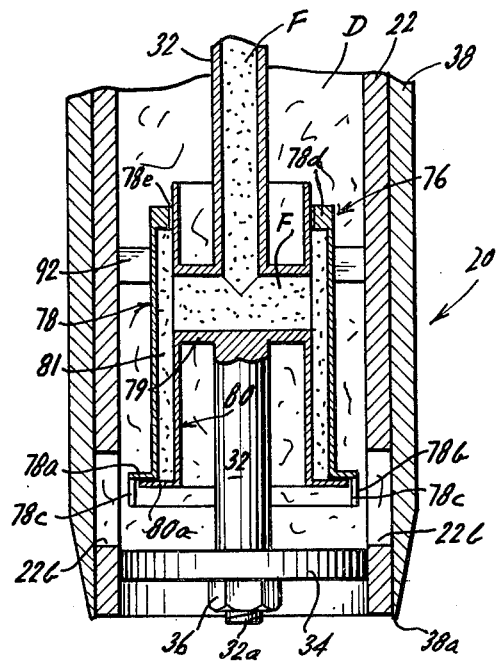
FIG. 2.
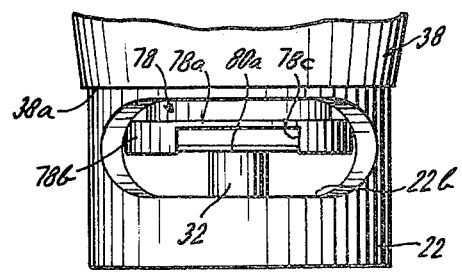
FIG. 6.
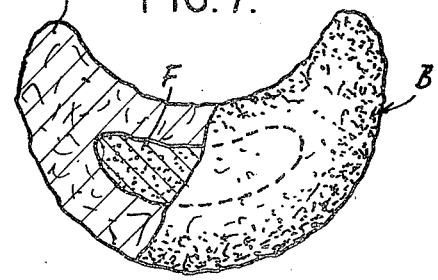
FIG. 7.
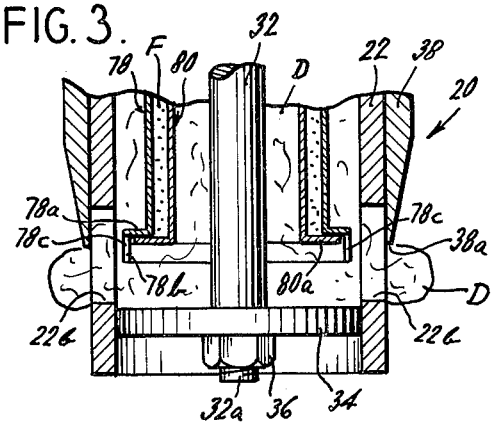
FIG. 3.
FIG. 4.
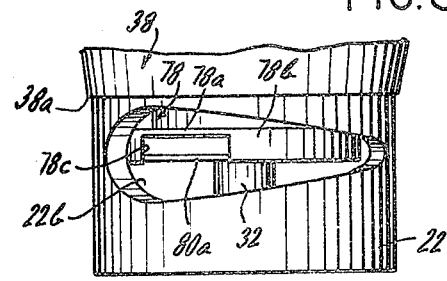
FIG. 8.
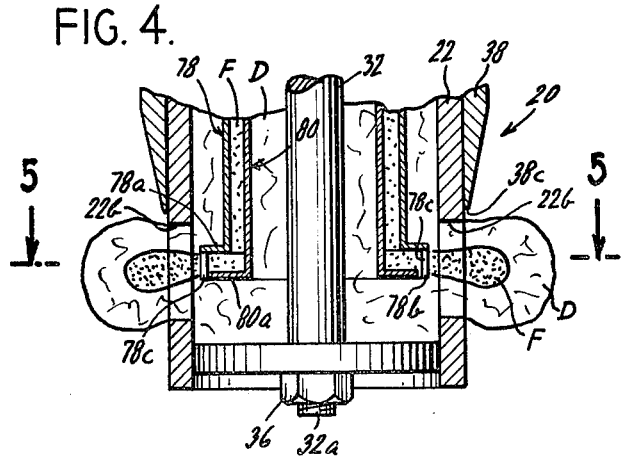
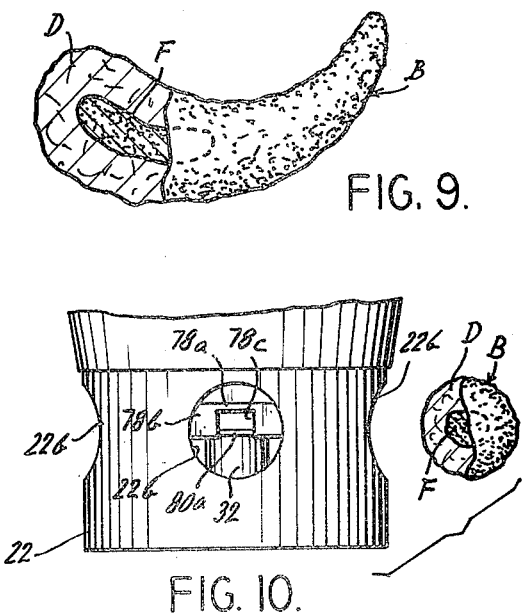
FIG. 9.
FIG. 10.

APPARATUS FOR FORMING A VARIETY OF SHAPED BODIES WITH AN INTERNAL FILLING

The present invention relates generally to a machine for the manufacture of a shaped food product of two different foodstuffs, and in particular to an apparatus for forming shaped bodies with an internal filling, useful in making variously shaped pastries filled with jelly, cream or other food compositions.

A typical machine for manufacturing shaped bodies from a plastic food material includes a forming mechanism having a stationary nozzle body with an orifice in its periphery and defining a chamber adapted to be connected in communication with a source of a plastic food material. A cutter sleeve is mounted on the nozzle body for movement relative thereto, and is normally disposed to close the orifice. The movement of the cutter sleeve relative to the nozzle body is effective to selectively open the orifice for forming a predetermined quantity of the plastic food material into a shaped body. As the cutter sleeve moves to close off the orifice the body is completed and cut, and then may be further processed as by being baked, fried or otherwise cooked or frozen.

Machines are available for forming doughnuts simultaneously with an annular filling, for example, the one disclosed in U.S. Pat. No. 3,807,919 assigned to the assignee of the present invention. However, such machines are useful only for forming annular bodies with annular fillings. On the other hand, a machine is needed which is readily adaptable to produce variously shaped filled bodies. Such a machine would permit the manufacture of variously shaped filled pastries or other food products on a single machine with minimal adjustments and would thereby reduce the cost of producing such products. As a result, certain much desired food products, such as imitation stuffed shrimp, could be made available to a larger segment of the public.

Preferably a machine for producing variously shaped filled products should be realized with minimal modification of existing equipment for manufacturing shaped bodies. Moreover, such a machine should be constructed to be easily assembled and dismantled, not only for changing the shape of the product and effecting required maintenance and repairs, but to permit frequent cleaning. Furthermore, such a machine should be sufficiently flexible to handle a wide variety of filling materials, to permit controlled filling rates per unit product, to facilitate automatic continuous operation and yet exhibit production flexibility and achieve the overall objectives of dependability, safety simplicity of design, and economy of construction.

Broadly, it is an object of the present invention to provide a machine for manufacturing shaped products of two different foodstuffs which realizes one or more of the aforesaid objectives.

In particular, it is an object of the present invention to provide an apparatus for forming shaped food bodies with an internal filling, which apparatus is readily adaptable to produce a wide variety of shapes.

It is another object of the present invention to provide an apparatus for forming shaped food products simultaneously with an internal filling, which apparatus can be constructed with minimal modification of existing forming equipment and satisfies the practical requirements of ease of assembly and disassembly, facility of cleaning and maintenance in accordance with sanitary codes, dependability, safety, simplicity of design and economy of construction.

In accordance with a first illustrative embodiment demonstrating objects and features of the present invention, there is provided a machine adaptable to manufacture variously shaped food products of two different foodstuffs, such as shaped pastries containing a filling of jam, jelly, cream or the like. The machine includes first and second pressurized tanks adapted to receive a supply of the first and second foodstuffs, respectively. A first forming mechanism is provided including a nozzle body with a first chamber in communication with the first tank, which nozzle body includes a plurality of shaped, first forming orifices in its periphery and a cutter sleeve mounted on the nozzle body for movement with respect thereto to selectively cover and uncover the first forming orifices. A second forming mechanism is provided including outer and inner concentric shell members coacting to define a second chamber within the first chamber and in communication with the second tank. The shell members are mounted for movement relative to each other and coact, when opened, to define a radially outwardly opening channel generally confronting the first forming orifices. The shell members normally close this channel, but progressively open it as a result of their relative movement. A third shell member is concentrically mounted to either the inner or outer shell member to obstruct the channel and includes, in its periphery, a plurality of shaped second forming orifices each confronting and in general alignment with one of the first forming orifices.

In operation, formation of the bodies is begun by operating the cutter sleeve to uncover the first forming orifices. After a predetermined first interval, the filling is supplied by moving the outer and inner shell members to open the channel for a predetermined second interval, during which time filling is injected into the forming body through the second forming orifices. After a predetermined third interval, the cutter sleeve is operated to cover the first forming orifices, thereby completing the formation of the body. The apparatus of the present invention is adapted to produce variously shaped bodies by replacing the nozzle body with one having first forming orifices of a desired shape, and when it is necessary to change the shape of the filling, by replacing the shell member to which the third shell member is mounted.

In accordance with a second embodiment, a machine of the type described is provided in which both the first and second forming orifices are changed with minimal disassembly of the forming mechanisms. The nozzle body is provided with an open bottom, and an outer cup-shaped member, having an opening conforming to the bottom opening in the nozzle body, is removably mounted to the nozzle body so as to close its bottom. The outer cup member includes a plurality of shaped first forming orifices corresponding functionally to the first forming orifices in the first embodiment. An inner cup member is detachably mounted to the inner shell member to obstruct the channel defined by the outer and inner shell members and includes second forming orifices confronting and generally aligned with the first forming orifices. Operation of this embodiment is identical to the operation of the first embodiment. The first and second forming orifices are conveniently changed by detaching and replacing the outer and inner cup members, respectively.

The above brief description as well as further objects, features and advantages of the present invention will be more fully appreciated by reference to the following detailed description of a presently preferred but, nonetheless, illustrative embodiment in accordance with the invention when taken in conjunction with the accompanying drawing, wherein:

FIG. 1 is an elevational view on a reduced scale with parts broken away and shown in section, of a machine for making filled pastries, which machine includes a forming apparatus, constructed in accordance with the present invention, for simultaneously forming a plurality of shaped dough bodies having an internal filling, the forming apparatus being shown in the closed or normal position thereof;

FIG. 2 is a fragmentary sectional elevational view of the lower portion of the apparatus of FIG. 1 showing the details of internal construction of the forming apparatus, the forming apparatus being shown in the closed or normal position thereof;

FIG. 3 is a fragmentary sectional elevational view similar to FIG. 2, showing the forming apparatus at the start of a forming cycle, at the beginning of the formation of elemental dough bodies and prior to the commencement of the introduction of filling therein, with a cutter sleeve of the apparatus having moved upwardly from its normal position wherein it closed the dough-forming orifice;

FIG. 4 is a fragmentary sectional elevational view similar to FIG. 3, with the forming process having progressed to the point where the cutter sleeve has moved to its uppermost position to open the dough-forming orifice, and the inner shell member has moved downwardly to initiate introduction of the filling into the dough body which is in the process of being formed;

FIG. 5 is a sectional view taken substantially along line 5—5 of FIG. 4 and looking in the direction of the arrows;

FIG. 6 is a fragmentary elevational view of the lower portion of a nozzle body of the present invention showing dough and filling orifices useful in forming a filled crescentic body;

FIG. 7 is an elevational view, with a part broken away and shown in section, of a body formed by using the orifice of FIG. 6;

FIG. 8 is a fragmentary elevational view of the lower portion of a nozzle body of the present invention illustrating dough and filling orifices useful in forming a filled shrimp-shaped body;

FIG. 9 is an elevational view, with a part broken away and shown in section, of a shrimp-shaped filled body formed by using the orifice of FIG. 8;

FIG. 10 is a fragmentary elevational view of the lower portion of a nozzle body of the present invention illustrating the dough and filling orifices useful for forming filled spherical bodies and also illustrating a body formed by these orifices; and FIG. 11 is a fragmentary sectional elevational view, similar to FIG. 4, illustrating an alternate arrangement of the forming apparatus in which cup members including peripheral orifices are removably mounted to the nozzle body and inner shell member.

Referring now to the drawing, and first to FIG. 1, a forming apparatus 20 is shown embodying the features of the present invention and is utilized in a machine for making shaped, filled pastries. The machine broadly comprises: the forming apparatus 20, which simultaneously produces a plurality of shaped filled pastries; actuating mechanisms 40 and 66 which are effective to operate the forming apparatus 20; and pressurized tanks 28 and 90 which store the dough D and filling substance F, respectively, and supply them to the forming apparatus 20.

FIGS. 1 through 4 show the details of the construction of the forming apparatus 20. The forming apparatus 20 includes a generally cylindrical elongated nozzle body or head 22 supported in a stationery position in any convenient fashion, as on the frame or chassis of the machine. At its upper end, the nozzle body 22 includes a larger diameter cylindrical portion 24 which is internally threaded at 26 for attaching the apparatus 20 to a threaded outlet end of the pressurized dough-supplying reservoir or tank 28. Near its lower end, the periphery of nozzle body 22 includes a plurality of nozzle openings 22b which are shaped in accordance with the shape of the product to be formed, as will be more fully explained hereinafter.

The interior of the nozzle body 22 defines an elongated dough-receiving chamber 30 which is filled with dough D from pressurized tank 28. Within the chamber 30 there is provided a pneumatically actuated disc assembly which includes a concentric axially-extending stem 32 which supports a disc 34 at its lower end. The disc 34 is attached to the stem 32 by a fastening nut 36 which fits over a threaded portion 32a of the stem 32. The disc 34 is dimensioned to contact the inner surface or wall of the nozzle body 22 and forms a closed bottom therefor. The stem 32 extends the entire length of the nozzle body 22, through pressurized tanks 28 and 90, and is mounted at its upper end on a pneumatic actuating mechanism, generally designated 40.

The pneumatic actuating mechanism 40 includes an air cylinder 42 having a piston chamber 44 which is closed at its upper end by a removable, threaded air cylinder seal or plug 46. The air cylinder 42 is mounted on top of the tank 90 and receives compressed air or some other operating fluid via hoses 56 and 58 coupled to piston chamber 44 via conventional coupling members 48 and 50, respectively. Air is introduced through hose 56 and coupling member 48 into the chamber 44 through an upper port 52, and in similar fashion, selectively through hose 58 and the coupling member 50 through a lower port 54.

Within the piston chamber 44 there is mounted a piston 60 having a sealing ring 60a thereabout. The piston 60 is displaced through the requisite stroke by the selective introduction of air into the chamber 44 through the upper and lower ports 52, 54. Depending from the piston 60 is a piston rod 62 which, by conventional means (not shown), supports depending stem 32 and attached disc 34.

By the controlled and selective introduction of air into the pneumatic actuating mechanism 40, disc 34 and the mechanisms associated therewith may be moved through a downward disc stroke (i.e., by introducing compressed air into the chamber 44 through lower port 54 and connecting the upper port 52 to exhaust or atmosphere). In the normal or starting position for a forming cycle, compressed air is admitted to the chamber 44 through the lower port 54 to maintain disc 34 in its uppermost position as illustrated in FIG. 1.

A cutter sleeve 38 having a cutting edge 38a is mounted on the nozzle body 22 for movement relative to both the nozzle body 22 and the disc 34. Reciprocating cutter sleeve 38 is moved through an upward stroke and a downward stroke (compare FIGS. 2 and 4) by a conventional cutter-actuating mechanism 66. The cutter-actuating mechanism 66 includes a circumferentially grooved follower collar 68 mounted on the upper end of cutter sleeve 38 and is connected, via a double arm lever 70, which is centrally pivoted at 72, to conventional motive means (not shown).

The arm 70a of lever 70, which extends toward the follower collar 68, is bifurcated and receives diammetrically opposed follower rollers 75 within the circumferential groove of the follower collar 68. The other arm 70b of the lever 70 is connected to the aforementioned motive means and can be selectively moved up and down.

When the arm 70b is driven upwardly, the cutter sleeve is in the starting position illustrated in FIG. 1. In this position, the sleeve 38 closes the dough-forming orifices 22b. When the arm 70b is driven downwardly, the cutter sleeve 38 moves through its upward stroke and progressively exposes the dough-forming orifices 22b as may be seen by comparing FIGS. 1, 3 and 4. When the cutter sleeve 38 again moves through its downward stroke, the shaped dough bodies which have been progressively formed, are completed, eventually severed, and fall from forming apparatus 20.

Disposed within the nozzle body 22 is an internal filling forming mechanism, generally designated by the reference numeral 76, which includes a stationary outer shell member 78 and a movable inner shell member 80. The shell members 78, 80 cooperate to define a vertically extending, elongated, annular filling receiving chamber 81 which receives the filling F from a supply, under pressure. The outer an dinner shell members 78, 80 include, respectively, at their lower ends, upper and lower radially and outwardly extending flanges 78a, 80a, which define a filling transporting channel therebetween. The flanges 78a, 80a are disposed one above the other and are arranged to normally abut and close off the flow of filling material as shown in FIGS. 1, 2 and 3.

In response to the downward movement of inner shell member 80, flanges 78a and 80a are separated, and filling material is permitted to flow in the filling transporting channel formed between them. A filling orifice ring or shell 78b depends from the radially outermost portion of flange 78a and includes a plurality of filling-forming orifices 78c therein which are generally aligned with the orifices 22b. Filling material is forced through the orifices 78c under control of the flanges 78a and 80a which act as a valve to control the flow of filling material, as explained above.

Turning now to the specific construction of the internal filling-forming mechanism 76, it is seen that the inner shell member 80 is formed with a pair of filling inlet ports formed by two radially and inwardly extending flanges 79 (see FIG. 2) which are joined to the stem 32. At this juncture and above it the stem 32 is hollow and at its top end includes apertures 32b opening into the filling tank 90. Pressurized filling material is thus supplied from the tank 90, via the hollow portion of the stem 32 and flanges 79, to the filling receiving chamber 81. The inner shell member 80 is joined, by means of flanges 79, to stem 32 and moves up and down along with the up and down movement of the disc 34.

Projecting radially outwardly from the outer shell member 78 are a plurality of spacers 92 which are fixed to the shell member 78 and which are seated against the inner wall of the nozzle body 22. The spacers 92 stabilize and support the outer shell member 78 and aid in retaining it within nozzle body 22.

The outer shell member 78 is formed with an integral, inwardly extending, top flange 78d which cooperates with the inner shell member 80 to close the top of the chamber 81. The top flange 78d is provided with a central opening 78e which is sized to receive the movable inner shell member 80. The inner shell member 80 has a body section 80b which is of a greater vertical extent than is the outer shell member 78 and which is fixed to stem 32 as previously described.

Prior to describing the remainder of the machine, it will be helpful to review the operation of the dough-forming and filling-forming mechanisms. At the start of the typical operating cycle, the dough chamber 30 within the nozzle body 22 is filled with dough D under pressure. The dough D fills the inner and outer annular spaces between nozzle body 22 and the stem 32, both at the inside and outside of the internal annular filling-forming mechanism 76. In a similar manner, the filling-forming mechanism 76 has its annular chamber 81 appropriately loaded with filling F, also under pressure. The dough-forming orifice 22b is closed due to the relative position of nozzle body 22 and cutter sleeve 38, with disc 34 being at the upper limit of its stroke and the cutter sleeve 38 being at the lower limit of its stroke (see FIG. 2). With the disc 34 being at the upper limit of its stroke, the movable inner shell member 80 is also in its uppermost position closing off the flow of filling material to the filling-forming orifices 78c, which confront the dough-forming orifices 22b.

In response to upward operation of the cutter actuating mechansim 66, the cutter sleeve 38 moves through its upward stroke whereupon the dough D, under pressure within chamber 30, begins to flow outwardly through the orifices 22b and begins to form the elemental shape of the bodies B.

The stem 32 is then moved downwardly to move disc 34 and the inner shell member 80 through its downward stroke (in response to the appropriate porting of the pneumatic mechanism 40).

As a result of the movement of inner shell member 80, flanges 78a and 80a separate and the filling material is forced through orifices 78c, as may be appreciated by comparing FIGS. 3 and 4, so that the filling F is extruded into the elemental dough body B during its formation.

When a predetermined amount of filling F is extruded into the elemental dough body B, the flow of filling material is closed off by the upward movement of inner member 80 along with disc 34 to once more bring flanges 78a and 80a into contact. Upon closing off of the flow of filling meterial and the subsequent movement of the cutter sleeve 38 through its downward stroke, the dough body is completely formed and contains its internal filling F. The dough body then drops from the closed cutter sleeve, as is generally understood.

In general, it will be appreciated that by appropriately timing the opening and closing of the dough-forming orifices 22b and by controlling the starting and stopping of the flow of filling material, as well as the duration of flow of both, it is possible to control the volume of the dough body, the volume of the filling, the disposition of the filling relative to the dough body and the overall shape of the product.

Storage tanks 28 and 90 can be any conventional form of storage tank. Storage tank 28 is filled with dough under pressure via pipe 26 joined to it by a conventional coupling member 27. Storage tank 90 is filled with filling material under pressure via pipe 91 connected to it by a conventional coupling member 92. As shown in FIG. 1, the two storage tanks 28, 90 are conveniently mounted with tank 90 on top of tank 28. With the tanks 28, 90 in this configuration the hollowed portion of stem 32 then functions as a conduit for filling material as previously described. In this arrangement, bearing/ seal 93 is provided to guide stem 32 and to prevent seepage between the two storage tanks around stem 32.

In order to produce bodies of a specifically desired shape and size with the above described machine, it is necessary to coordinate the movement of cutter sleeve 38 and stem 32. U.S. Pat No. 3,807,919 describes an arrangement for coordinating such movements in a machine for forming filling dough toroids. This arrangement is readily adapted to coordinate the movements of the machine of the present invention.

It will be appreciated that the shape and arrangement of the orifices 22b and 78c will determine the general contours of the dough body and the filling. FIG. 6 illustrates an arrangement of the orifices 22b, 78c that will produce the crescentic filled body of FIG. 7. The dough-forming orifices 22b have parallel tops and bottoms and curved sides. Each filling-forming orifice 78c confronts one of dough-forming orifices 22b and is centered with respect to it. As a result, the filling is centered within the dough in the crescentic body B of FIG. 7.

The orifice arrangement of FIG. 8 is useful for creating shrimp-shaped filled bodies as shown in FIG. 9. Here the dough-forming orifices 22b taper from one end to the other and therefore produce a wedge-shaped crescentic body. Each filling-forming orifice 78c is offset towards the left, as indicated, to place the filling in the widest portion of the dough body B.

When generally circular dough-forming orifices 22b are employed as shown in FIG. 10, the dough bodies produced have a generally spherical shape. Here, the filling-forming orifices 78c were oriented to put the filling material in approximately the middle of the spherical dough bodies.

It will be appreciated from the above discussion that the forming apparatus 20 can be adapted to form different shapes of filled bodies. To change the shape of the body being formed, cutter sleeve 38 is removed from nozzle body 22 and nozzle body 22 is unscrewed from the bottom of tank 28 and replaced with a nozzle body having forming apertures 22b of the desired shape. If a different number of filling forming apertures 78c are required or differently shaped apertures are required, (e.g. compare FIG. 7 with FIG. 10) it is also necessary to change outer shell member 78. This is accomplished by detaching stem 32 from piston rod 62, slipping outer shell member 78 off of inner shell member 80 and stem 32, and replacing outer shell member 78 with one having the desired aperture arrangement on shell 78b. Upon reassembly, forming apparatus 20 will produce filled bodies of the desired shape in the manner previously described.

FIG. 11 illustrates an alternate embodiment of the forming apparatus 20 of FIG. 1 which is more readily adapted to forming filled bodies of different shapes. This alternate embodiment is identical in all respects to the apparatus of FIG. 1 except for its lower portion and therefore, only the lower portion of the forming apparatus is shown in FIG. 11. In accordance with the alternate embodiment of FIG. 11, nozzle body 22 is foreshortened to a point above dough-forming apertures 22b and is undercut at 22a. A cylindrical cup 23, having the same outside diameter as nozzle body 22, forms a new closed bottom for nozzle body 22. Cup 23 has a concentric hole in its bottom and can be mounted onto shaft 32 in place of disc 34 of FIG. 1. Cup 23 has a recessed lip 23a about its open top, which lip engages undercut 22a to prevent leakage of dough between them. Cup 23 will move up and down with stem 32 as disc 34 did in FIG. 1, but even at the lowest position of cup 23, indicated in FIG. 11, there is still a sufficient seal between undercut portion 22a and lip 23a to prevent leakage of dough between them. Cup 23 also has dough-forming orifices 23b which serve the same purpose as dough-forming orifices 22b of FIG. 1.

The embodiment of FIG. 11 also includes a cylindrical filling-forming orfice cup 95 which makes it possible to change the filling-forming orifices without extensive disassembly of the forming apparatus 20. Cup 95 has a hole 95a in its bottom which permits it to be slid over stem 32 to engage flange 80 a. A cylindrical spacer 96 is then placed on stem 32 so that when cup 23 is secured by tightening nut 36, cup 95 is securely held against flange 80a. As a result, cups 23 and 95 and inner shell member 80 move as a single unit along with stem 32. In operation, vertical wall 95b of cup 95 serves the same purpose as filling orifice shell 78b of FIG. 1 and orifices 95c in wall 95b correspond to filling-forming orifices 78c.

It should be noted that the alternate embodiment of FIG. 11 is readily adapted to form dough bodies of different shapes without disassembling the entire forming apparatus 20. It is only necessary to remove the nut 36 and replace cups 23 and 95 with different cups having the desired shape of apertures 23b and 95b.

Although specific embodiments of the invention have been disclosed for illustrative purposes, it will be apparent to one skilled in the art that various modification, additions and substitutions can be made without departing from the scope and spirit of the invention. For example, in the embodiment of FIG. 1 cup 95 could be used without also using cup 23; or in the embodiment of FIG. 4 cups 23 and 95 and spacer 96 could be formed as a single piece. Accordingly, the scope of the invention is to be construed broadly and in a manner consistent with the scope and spirit of the invention herein and is not to be limited by the foregoing description of the presently preferred but nonetheless illustrative embodiments.

What is claimed is:

1. An apparatus for simultaneously forming a plastic material and a filling material into shaped bodies, each having an internal filling, said apparatus comprising a forming mechanism including a nozzle body having a plurality of shaped orifices in its periphery for forming said plastic material and defining an outer chamber adapted to be connected in communication with a source of said plastic material, a cutter sleeve mounted on said nozzle body for movement relative thereto, said cutter sleeve being normally disposed to close said plastic material forming orifices and being moveable relative to said nozzle body to selectively cover and uncover said plastic material forming orifices; a filling forming mechanism disposed within said nozzle body and including outer and inner members arranged to define an inner chamber therebetween adapted to be connected in communication with a source of filling material, means mounting said outer and inner members for movement relative to one another, said outer and inner members being normally disposed to retain said filling material in said inner chamber and coacting, when opened, to define an outwardly opening channel confronting said plastic material forming orifices and permitting the exiting of said filling material from said inner chamber, a shell mounted to one of said outer and inner members and arranged to confront said channel, said shell having a plurality of shaped filling material forming orifices therein each being arranged in confronting relation to one of said plastic material forming orifices, said outer and inner members and said shell being constructed and arranged so that the closing and opening of said inner chamber is effective to cover and uncover said filling material forming orifices; and actuating means for said plastic material forming and said filling material forming mechanisms adapted to selectively uncover and cover said plastic and filling material forming orifices in timed relation to one another.

2. A forming apparatus according to claim 1 wherein each of said filling material forming orifices is generally aligned with one of said plastic material forming orifices.

3. A forming apparatus according to claim 1 wherein said outer member of said filling forming mechanism is stationary and said inner member is mounted for movement relative thereto.

4. A forming apparatus according to claim 1 wherein said shell is fixed to said outer member.

5. A forming apparatus according to claim 1 wherein said outer and inner members include upper and lower radially outwardly extending flanges defining said channel, said flanges being disposed one above the other and arranged normally to abut so as to close said channel and being relatively movable in substantial parallelism to progressively increase the vertical extent of said channel.

6. A forming apparatus according to claim 1 wherein said shell depends from the radial extreme of said upper channel defining flange.

7. A forming apparatus according to claim 1 including a stem coaxially disposed within said nozzle body, said outer member being mounted in said nozzle body concentric thereof and said inner member being mounted on said stem concentric thereof whereby said inner chamber is substantially surrounded by said outer chamber.

8. A forming apparatus according to claim 7 wherein said stem is substantially hollow and serves as a conduit for transporting said filling material from said filling material source to said inner chamber.

9. An apparatus for forming a plastic material and a filling material into bodies each having an internal filling, said apparatus comprising a first forming mechanism defining an outer chamber adapted to be connected in communication with a source of plastic material, said first forming mechanism including a nozzle body having a periphery and having an open bottom, cup means having a periphery conforming to the periphery of said nozzle body and being detachably mounted relative to said nozzle body to close the open bottom of said nozzle body, said cup means having at least one orifice in its periphery for forming said plastic material, a cutter mounted on said nozzle body for movement relative to said nozzle body and said cup means, said cutter being normally disposed to close said plastic material forming orifice and being movable relative to said nozzle body and said cup means to selectively open said plastic material forming orifice; a second forming mechanism disposed within said nozzle body and including an inner chamber adapted to be connected in communication with a source of filling material, said second forming mechanism having at least one filling material forming orifice in its periphery and including closure means normally closing said filling material forming orifice and being actuable to open said filling material forming orifice; and actuating means operatively coupled to said cutter and said closure means for selectively opening and closing said plastic material forming orifice and said filling material forming orifice in timed relation to one another.

10. The apparatus of claim 9 wherein said cup means has a plurality of plastic material forming orifices in its periphery and said second forming mechanism includes a plurality of filling material forming orifices in its periphery, each of said filling material forming orifices confronting one of said plastic material forming orifices.

11. The apparatus of claim 9 further comprising a stem coaxially mounted is said nozzle body and extending therebelow, said cup means being detachably secured to said stem for mounting said cup means to said nozzle body.

12. A forming apparatus according to claim 11 wherein said stem is substantially hollow and serves a conduit for transporting said filling material from said filling material source to said inner chamber.

13. An apparatus for producing shaped bodies, each having an internal filling, from a plastic material and a filling material, said apparatus comprising a forming mechanism for said plastic material including a generally longitudinally extending outer chamber adapted to be connected in communication with a source of supply of said plastic material and further including at least one shaped plastic material forming orifice in its periphery, and first closure means normally closing said plastic material forming orifice; a generally longitudinally extending filling forming mechanism disposed within said outer chamber and including first and second members arranged to define an inner chamber adapted to be connected in communication with a source of filling material, means mounting said first and second members for movement relative to one another, said members being normally disposed to close said inner chamber and coacting, when opened, to define a generally transversely extending and outwardly opening channel confronting each plastic material forming orifice for permitting passage therethrough of said filling material, inner cup means adapted to be mounted to said inner chamber to obstruct said filling material channel, said inner cup means having at least one filling material forming orifice in its periphery positioned to confront a corresponding plastic material forming orifice when said inner cup means is mounted to said inner chamber, and means detachably mounting said inner cup means to said inner chamber; actuating means operatively coupled to said first closure means and to said means mounting said outer and inner members for opening and closing all plastic material forming orifices and all filling material forming orifices in timed relationship to each other.

14. The apparatus of claim 13 wherein each of said filling material forming orifices is generally aligned with a respective one of said plastic material forming orifices.

15. The apparatus of claim 13 wherein said outer chamber includes a nozzle body having an open bottom and outer cup means adapted to engage said open bottom, said outer cup means having said plastic material forming orifices in its side, and means detachably mounting said outer cup means to close the open bottom of said nozzle body.

16. The apparatus of claim 13 wherein said first and second members correspond, respectively, to outer and inner members.

17. The apparatus according to claim 16 wherein said outer member of said filling forming mechanism is stationary and said inner member is mounted for movement relative thereto.

18. The apparatus according to claim 16 wherein said outer and inner members include upper and lower outwardly extending flanges defining said channel, said flanges being disposed one above the other and arranged normally to abut so as to close said channel and being relatively movable in substantial parallelism to progressively increase the vertical extent of said channel.

19. The apparatus of claim 18 wherein said inner cup means includes a bottom wall and is mounted with said bottom wall in engagement with one of said upper and lower flanges.

20. The apparatus of claim 19 wherein said inner cup means is mounted with its bottom wall in engagement with said lower flange.

21. A forming apparatus according to claim 19 including a stem coaxially disposed within said nozzle body, said outer member being mounted in said nozzle body coaxially thereof and said inner member being mounted on said stem coaxially thereof, said inner cup mounting means mounting said inner cup on said stem coaxially thereof and in engagement with said lower flange.

22. A forming apparatus according to claim 19 wherein said stem is substantially hollow and serves as a conduit for transporting said filling material form said filling material source to said inner chamber 23. An apparatus for producing, from a plastic material and a filling material, shaped bodies having an internal filling, said apparatus comprising a first forming mechanism for forming said shaped bodies including an outer chamber adapted to be connected to a source of said plastic material and having at least one shaped plastic material forming orifice in its periphery, and first closure means normally closing said plastic material forming orifice; a second forming mechanism disposed within said first forming mechanism and including an inner chamber adapted to be connected to a source of said filling material, said inner chamber having in its periphery at least one filling material forming orifice confronting a corresponding plastic material forming orifice, and second closure means normally closing all of said filling material forming orifices; and actuating means operatively coupled to said first and second closure means for opening and closing all of said plastic material forming orifices and all of said filling material forming orifices in timed relationship to each other so that all of said plastic material forming orifices are opened during a predetermined interval to form said body, said filling material forming orifices being opened only after the beginning of said predetermined interval to begin forming said filling and being once again closed before the end of said predetermined interval to complete the formation of said filling, all of said plastic material forming orifices being closed at the end of said predetermined interval to complete the formation of said filled bodies.

24. The apparatus of claim 23 wherein each of said filling material forming orifices is generally aligned with a corresponding one of said plastic material forming orifices.

25. The apparatus of claim 23 wherein said outer chamber includes a nozzle body having an open bottom and cup means having a periphery conforming to the periphery of said nozzle body and being removably mounted to close the open bottom of said nozzle body, said cup means having said at least one plastic material forming orifice in its periphery.

* * * * *